(12) United States Patent
Sone

(10) Patent No.: US 9,830,941 B2
(45) Date of Patent: Nov. 28, 2017

(54) RECORDING LAYER FOR OPTICAL RECORDING MEDIUM AND OPTICAL RECORDING MEDIUM

(71) Applicant: Sony Corporation, Tokyo (JP)

(72) Inventor: Yasuhiro Sone, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 15/037,286

(22) PCT Filed: Nov. 19, 2014

(86) PCT No.: PCT/JP2014/005822
§ 371 (c)(1),
(2) Date: May 17, 2016

(87) PCT Pub. No.: WO2015/083337
PCT Pub. Date: Jun. 11, 2015

(65) Prior Publication Data
US 2016/0293201 A1 Oct. 6, 2016

(30) Foreign Application Priority Data

Dec. 4, 2013 (JP) .................. 2013-251558

(51) Int. Cl.
*G11B 7/24* (2013.01)
*G11B 7/243* (2013.01)
(Continued)

(52) U.S. Cl.
CPC .......... *G11B 7/243* (2013.01); *G11B 7/24038* (2013.01); *G11B 7/257* (2013.01);
(Continued)

(58) Field of Classification Search
CPC ..... G11B 7/243; G11B 7/257; G11B 7/24038; G11B 2007/2432; G11B 2007/2571; G11B 2007/24306; G11B 2007/24038; G11B 2007/25708

See application file for complete search history.

(56) References Cited

U.S. PATENT DOCUMENTS

| 2005/0253210 A1 | 11/2005 | Uno et al. |
| 2011/0123756 A1 | 5/2011 | Kojima et al. |

(Continued)

FOREIGN PATENT DOCUMENTS

| JP | 2007-073154 A | 3/2007 |
| JP | 2012-164374 A | 8/2012 |

(Continued)

OTHER PUBLICATIONS

Written Opinion and English translation thereof dated Jan. 13, 2015 in connection with International Application No. PCT/JP2014/005822.

(Continued)

*Primary Examiner* — Elizabeth Mulvaney
(74) *Attorney, Agent, or Firm* — Wolf, Greenfield & Sacks, P.C.

(57) ABSTRACT

An optical recording medium includes a transmissive recording layer containing an oxide of a metal $M_A$, an oxide of a metal $M_B$, and an oxide of a metal $M_C$. The metal $M_A$ is at least one kind selected from the group consisting of Mn and Ni. The metal $M_B$ is at least one kind selected from the group consisting of W and Mo. The metal Mc is Zr. An atomic ratio $(M_A/M_B)$ of the metal $M_A$ to the metal $M_B$ is not less than 0.37 and not more than 1.31. The metal $M_C$ is contained in the transmissive recording layer at not less than 0.9 atomic % and not more than 27.5 atomic %.

13 Claims, 5 Drawing Sheets

(51) Int. Cl.
*G11B 7/24038* (2013.01)
*G11B 7/257* (2013.01)

(52) U.S. Cl.
CPC ............ *G11B 2007/2432* (2013.01); *G11B 2007/24306* (2013.01); *G11B 2007/2571* (2013.01); *G11B 2007/25708* (2013.01); *G11B 2007/25715* (2013.01)

(56) References Cited

U.S. PATENT DOCUMENTS

| | | |
|---|---|---|
| 2012/0201993 A1 | 8/2012 | Tabata |
| 2013/0095348 A1 | 4/2013 | Tabata |
| 2014/0030489 A1* | 1/2014 | Miki .................... G11B 7/2403 428/167 |

FOREIGN PATENT DOCUMENTS

| | | |
|---|---|---|
| JP | 2013-086336 A | 5/2013 |
| WO | WO 2004/027770 A1 | 4/2004 |
| WO | WO 2010/095466 A1 | 8/2010 |

OTHER PUBLICATIONS

International Preliminary Report on Patentability and English translation thereof dated Jun. 16, 2016 in connection with International Application No. PCT/JP2014/005822.

* cited by examiner

A

B

RECORDING LAYER FOR OPTICAL RECORDING MEDIUM AND OPTICAL RECORDING MEDIUM

CROSS REFERENCES TO RELATED APPLICATIONS

This is a U.S. national stage entry under 35 U.S.C. §371 of International Application No. PCT/JP2014/005822, filed on Nov. 19, 2014, which claims priority to Japanese Patent Application JP 2013-251558, filed on Dec. 4, 2013. Each of these applications is hereby incorporated by reference in its entirety.

TECHNICAL FIELD

The present technique relates to a recording layer for an optical recording medium and relates to an optical recording medium. Specifically, the present technique relates to a recording layer for an optical recording medium, which contains metallic oxides, and relates to an optical recording medium provided with the recording layer.

BACKGROUND ART

Recently, a technique for forming a recording layer by layering multiple layers is widely used in optical recording mediums in order to further increase recording capacity. In a multilayer optical recording medium, in order to make a sufficient amount of light reach a recording layer that is arranged at the innermost side from the surface of the medium, recording layers, which can transmit laser light to be used for recording and reproducing, (hereinafter called "transmissive recording layers" as necessary), are used as recording layers that are arranged at upper sides of the innermost side layer.

As a material for the transmissive recording layer, a material containing an oxide of at least one metal selected from the group consisting of tungsten (W) and molybdenum (Mo) and containing an oxide of at least one metal selected from the group consisting of copper (Cu), manganese (Mn), nickel (Ni), and silver (Ag), is proposed (for example, refer to Patent Literature 1).

CITATION LIST

Patent Literature

Patent Literature 1: JP 2013-086336A

SUMMARY OF INVENTION

Technical Problem

Recently, a material for providing a high transmittance, a high recording sensitivity, and a high S/N (high modulation degree) to the transmissive recording layer, is desired.

Accordingly, an object of the present technique is to provide a recording layer for providing a high transmittance, a high recording sensitivity, and a high S/N (high modulation degree) to an optical recording medium, and to provide an optical recording medium having the recording layer.

Solution to Problem

In order to solve the above problem, a first technique provides an optical recording medium including a transmissive recording layer containing an oxide of a metal $M_A$, an oxide of a metal $M_B$, and an oxide of a metal $M_C$. The metal $M_A$ is at least one kind selected from the group consisting of Mn and Ni. The metal $M_B$ is at least one kind selected from the group consisting of W and Mo. The metal Mc is Zr. An atomic ratio ($M_A/M_B$) of the metal $M_A$ to the metal $M_B$ is not less than 0.37 and not more than 1.31. The metal $M_C$ is contained in the transmissive recording layer at not less than 0.9 atomic % and not more than 27.5 atomic %.

A second technique provides a recording layer for an optical recording medium, including: an oxide of a metal $M_A$; an oxide of a metal $M_B$; and an oxide of a metal $M_C$. The metal $M_A$ is at least one kind selected from the group consisting of Mn and Ni. The metal $M_B$ is at least one kind selected from the group consisting of W and Mo. The metal Mc is Zr. An atomic ratio ($M_A/M_B$) of the metal $M_A$ to the metal $M_B$ is not less than 0.37 and not more than 1.31. The metal $M_C$ is contained in the transmissive recording layer at not less than 0.9 atomic % and not more than 27.5 atomic %.

Advantageous Effects of Invention

As described above, according to the present technique, a high transmittance, a high recording sensitivity, and a high S/N (high modulation degree) are achieved.

DESCRIPTION OF EMBODIMENTS

In the present technique, it is preferable that one or multiple transmissive recording layers are provided on a substrate and that a cover layer is provided on the transmissive recording layer. The thickness of the cover layer is not specifically limited, and the cover layer includes a substrate, a sheet, a coating layer, and so on. Since an objective lens having a high NA may be used for a high density optical recording medium, a light transmissive thin layer such as a sheet or a coating layer is preferably used as the cover layer so that recording and reproducing of information signals can be performed by irradiating with light from a side of the light transmissive layer. In this case, an opaque material can be used for the substrate. A surface, from which light enters for recording and reproducing information signals, is appropriately set on at least one of surfaces of the cover layer and the substrate according to the format of an optical recording medium.

In the present technique, the transmissive recording layer preferably further includes a dielectric layer on at least one of surfaces of the transmissive recording layer, and more preferably includes a dielectric layer on both surfaces of the transmissive recording layer, from the viewpoint of enhancement of storage reliability. The transmissive recording layer is preferably used alone without providing a dielectric layer on the surface of the transmissive recording layer from the viewpoint of simplification of the layer structure and the production facilities.

In the present technique, in a case of using two or more transmissive recording layers, each of the transmissive recording layers preferably contains the same kinds of materials, that is, an oxide of a metal $M_A$, an oxide of a metal $M_B$, and an oxide of a metal $M_C$, and more preferably has the same composition ratio of the metals $M_A$, $M_B$, and $M_C$, from the viewpoint of the productivity.

In a case of using two transmissive recording layers, the amount of the metal $M_C$ that is contained in the transmissive recording layer is preferably not less than 0.9 atomic % and not more than 27.5 atomic %. In addition, in a case of using three transmissive recording layers, the amount of the metal $M_C$ that is contained in the transmissive recording layer is preferably not less than 0.9 atomic % and not more than 8.5 atomic %.

Embodiments of the present technique will be described in the order as indicated below.
1. Structure of Optical Recording Medium
2. Production Method of Optical Recording Medium
3. Advantageous Effects
4. Modifications

[1 Structure of Optical Recording Medium]

Figure 1:
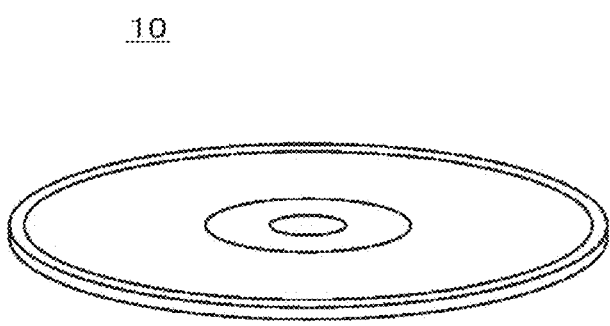
FIG. 1A is a perspective view showing an example of an appearance of an optical recording medium according to an embodiment of the present technique.
FIG. 1B is a cross sectional schematic view showing an example of a structure of an optical recording medium according to an embodiment of the present technique.
Figure 1:
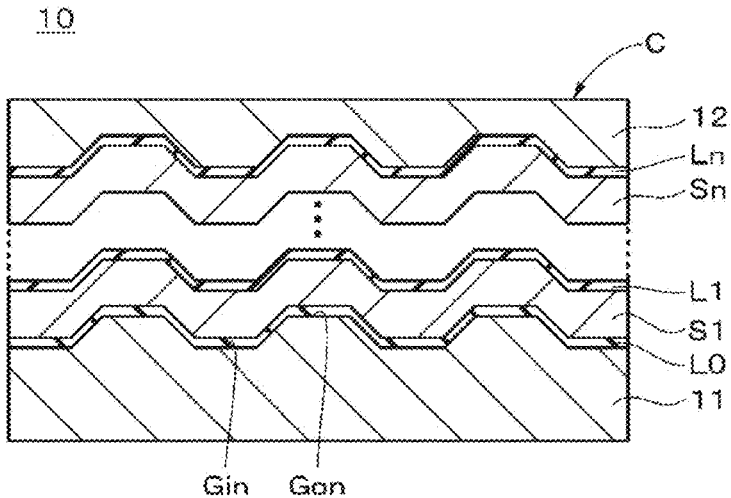

As shown in FIG. 1A, an optical recording medium 10 according to an embodiment of the present technique has a disc shape that is provided with an opening (hereinafter called a "center hole") at the center. It should be noted that the shape of the optical recording medium 10 is not limited to the shape described above and can have a card-like shape.

As shown in FIG. 1B, the optical recording medium 10 is a so-called write-once type multilayer optical recording medium and is constructed by laminating an information signal layer L0, a middle layer S1, an information signal layer L1, . . . , a middle layer Sn, an information signal layer Ln, and a light transmissive layer 12, which functions as a cover layer, in this order, from one main surface of a substrate 11. Here, "n" is an integer of, for example, 2 or more, preferably, 3 or more or 4 or more. The information signal layer L0 is arranged at the innermost side with respect to a surface C, and the information signal layers L1 to Ln are arranged at the upper sides of the information signal layer L0. In view of this structure, the information signal layers L1 to Ln are configured to transmit laser light that is to be used for recording and reproducing.

In the optical recording medium 10 according to this embodiment, information signals are recorded or reproduced by irradiating each of the information signal layers L0 to Ln with laser light from the surface C on the light transmissive layer 12 side. For example, laser light having a wavelength in a range of not less than 400 nm and not more than 410 nm is condensed by an objective lens having a numerical aperture in a range of not less than 0.84 and not more than 0.86, and then this light is irradiated from the light transmissive layer 12 side to each of the information signal layers L0 to Ln, whereby information signals are recorded or reproduced. The information signal layers L0 to Ln have a storage capacity of 25 GB or more with respect to a wavelength of 405 nm and a condenser lens with a numerical aperture NA of 0.85, for example. The optical recording medium 10 having such a structure includes, for example, a multilayer blue-ray disc (BD: Blu-ray Disc (registered trademark)). Hereinafter, the surface C, which is to be irradiated with laser light for recording and reproducing information signals in the information signal layers L0 to Ln, is called a "light irradiation surface C".

Hereinafter, the substrate 11, the information signal layers L0 to Ln, the middle layers S1 to Sn, and the light transmissive layer 12, which construct the optical recording medium 10, are described one by one.

(Substrate)

The substrate 11 has a disc shape that is provided with a center hole at the center, for example. A main surface of the substrate 11 is, for example, a grooved surface, and the information signal layer L0 is formed on the grooved surface. Hereinafter, a recessed portion of the grooved surface is called an "in-groove Gin", whereas a projected portion of the grooved surface is called an "on-groove Gon".

The shape of the in-groove Gin and the on-groove Gon includes various kinds of shapes such as a spiral shape or a concentric circular shape, for example. Moreover, at least one of the in-groove Gin and the on-groove Gon is wobbled (meandered) so as to, for example, stabilize a linear velocity or add address information.

The diameter of the substrate 11 may be set at 120 mm, for example. The thickness of the substrate 11 is set in consideration of the rigidity and is preferably not less than 0.3 mm and not more than 1.3 mm, more preferably not less than 0.6 mm and not more than 1.3 mm. For example, the thickness of the substrate 11 is set at 1.1 mm. The diameter of the center hole is set at 15 mm, for example.

As the material for the substrate 11, for example, a plastic material or glass may be used, and the plastic material is preferably used from the viewpoint of the cost. As the plastic material, for example, a polycarbonate resin, a polyolefin resin, an acrylic resin, and the like, may be used.

(Information Signal Layer)

Figure 2:
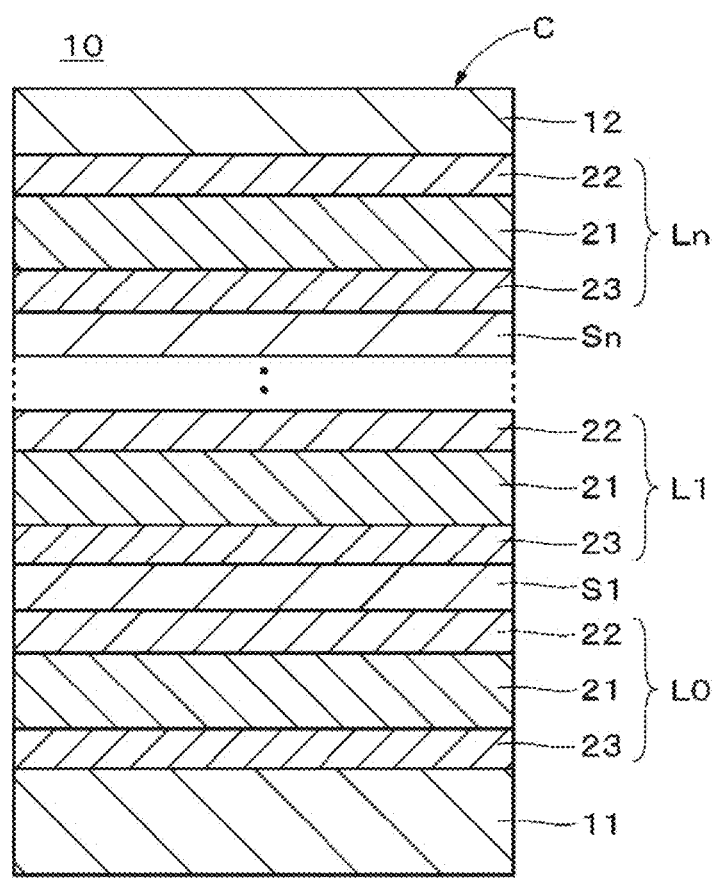
FIG. 2 is a schematic view showing an example of a structure of each information signal layer.

As shown in FIG. 2, each of the information signal layers L0 to Ln includes, for example, a recording layer 21, which has an upper surface (first main surface) and a lower surface (second main surface), a dielectric layer 22, which is provided adjacent to the upper surface of the recording layer 21, and a dielectric layer 23, which is provided adjacent to the lower surface of the recording layer 21. By forming such a structure, the storage reliability of the information signal layers L0 to Ln is enhanced. Here, the upper surface is one of the main surfaces of the recording layer 21, which is arranged at a side to be irradiated with laser light for recording and reproducing information signals, and the lower surface is the other main surface, which is arranged at a side that is opposite to the side to be irradiated with laser light, that is, on a substrate side.

(Recording Layers of Information Signal Layers L1 to Ln)

The recording layers 21 of the information signal layers L1 to Ln are transmissive recording layers, which are configured to transmit laser light for recording and reproducing information signals so that recording and reproducing be performed with respect to the recording layers 21 that are arranged at inner sides when viewed from the light irradiation surface C.

At least one of the recording layers 21 of the information signal layers L1 to Ln is an inorganic recording layer that contains an oxide of a metal $M_A$, an oxide of a metal $M_B$, and an oxide of a metal $M_C$. All of the recording layers 21 of the information signal layers L1 to Ln may be formed so as to be made of the same material, which contains the oxide of the metal $M_A$, the oxide of the metal $M_B$, and the oxide of the metal $M_C$. Conversely, the recording layers 21 of the information signal layers L0 to Ln may be formed so as to be made of materials that are different from each other depending on necessary characteristics (for example, optical characteristics, durability, and the like). It is preferable to use the same material for forming all of the recording layers 21 of the information signal layers L1 to Ln from the viewpoint of the productivity. By using the same material, the productivity of the optical recording medium 10 is improved. Such an effect is increased in a medium having a greater number of the information signal layers L1 to Ln.

As the metal $M_A$, a material, which has an absorption coefficient of some extent when the material is oxidized, and which has an absolute value of a standard formation free energy of the oxide that is smaller than the absolute value of a standard formation free energy of the oxide of the metal $M_B$, is used. By using such a material, the recording layer 21 absorbs laser light and converts the laser light into heat, whereby oxygen is released and the recording layer 21 is expanded. Thus, information signals are recorded by irradiating with laser light. As the metal $M_A$ having the above characteristics, at least one kind selected from the group consisting of manganese (Mn) and nickel (Ni) is used.

It is preferable to use both Mn and Ni as the metal $M_A$ from the viewpoint of improvement of a power margin. In this case, the atomic ratio (Mn/Ni) of Mn to Ni is preferably not less than 0.4 and not more than 2.6. This is because the power margin is greatly improved when the atomic ratio (Mn/Ni) is within this range. It is preferable to use Ni as the metal $M_A$ from the viewpoint of decrease in deterioration of sensitivity to the power of laser after preservation for a long time.

As the metal $M_B$, a material, which is approximately transparent and has an extinction coefficient "k" of zero or approximately zero when the material is oxidized, is used. As the metal $M_B$ having such characteristics, at least one kind selected from the group consisting of tungsten (W) and molybdenum (Mo) is used.

It is preferable to use both W and Mo or to use Mo as the metal $M_B$ from the viewpoint of improvement of a power margin. In this case, the atomic ratio (W/Mo) of W to Mo is preferably not more than 2.0. This is because the power margin is greatly improved when the atomic ratio (W/Mo) is within this range.

The atomic ratio ($M_A/M_B$) of the metal $M_A$ to the metal $M_B$ is preferably not less than 0.37 and not more than 1.31, more preferably, not less than 0.54 and not more than 0.78. When the metal $M_C$ is contained in the recording layer 21 in a range of not less than 0.9 atomic % and not more than 27.5 atomic %, the atomic ratio ($M_A/M_B$) is particularly preferably set within the range described above. If the atomic ratio ($M_A/M_B$) is not less than 0.37, the recording layer 21 can be made to have a modulation degree of not less than 40.0%. Moreover, if the atomic ratio ($M_A/M_B$) is not less than 0.54, the recording layer 21 can be made to have a modulation degree of not less than 45.0%. On the other hand, if the atomic ratio ($M_A/M_B$) is not more than 1.31, the recording layer 21 can be made to have a transmittance of not less than 60.0%. Moreover, if the atomic ratio ($M_A/M_B$) is not more than 0.78, the recording layer 21 can be made to have a transmittance of not less than 70.0%.

If the modulation degree is not less than 40.0, information signals can be reproduced by using an existing consumer drive. Moreover, if the modulation degree is not less than 45.0, information signals can be reproduced by using an existing consumer drive even when the modulation degree is degraded due to perturbations.

If the recording layer 21, which is included in the information signal layer Ln (here, "n" is an integer of 3 or more, preferably, 3) that is nearest to the light irradiation surface C, has a transmittance of not less than 60.0%, a sufficient amount of laser light can be made to reach an information signal layer Ln−1, which is arranged at the first inner side of the information signal layer Ln when viewed from the light irradiation surface C. For example, assuming that the upper limit of the recording power of an existing consumer drive is 38.0 mW, laser light having recording power of 22.8 mW is irradiated to the information signal layer Ln−1.

If the recording layers 21, which are included in the information signal layers Ln and Ln−1 (here, "n" is an integer of 4 or more, preferably, 4), have a transmittance of not less than 70.0%, a sufficient amount of laser light can be made to reach an information signal layer Ln−2, which is arranged at the second inner side of the information signal layer Ln when viewed from the light irradiation surface C. For example, assuming that the upper limit of the recording power of an existing consumer drive is 38.0 mW, laser light having recording power of 18.62 mW is irradiated to the information signal layer Ln−2.

It is preferable to use both Mn and Ni as the metal $M_A$ and simultaneously use both W and Mo as the metal $M_B$ from the viewpoint of improvement of a power margin and the viewpoint of decrease in deterioration of sensitivity to laser power after preservation for a long time.

The metal $M_C$ is Zr. By adding an oxide of the metal $M_C$ in the recording layer 21, the transmittance and the modulation degree of the recording layer 21 are improved. The amount of the metal $M_C$ contained in the recording layer 21 is preferably not less than 0.9 atomic % and not more than 27.5 atomic %, more preferably not less than 0.9 atomic % and not more than 8.5 atomic %, further preferably not less than 5.5 atomic % and not more than 8.5 atomic %. When the atomic ratio ($M_A/M_B$) of the metal $M_A$ to the metal $M_B$ is in a range of not less than 0.37 and not more than 1.31, the amount of the metal $M_C$ is specifically preferably set within the range described above.

If the amount of the metal $M_C$ is not less than 0.9 atomic %, a modulation degree of not less than 40.0 is obtained. Moreover, if the amount of the metal $M_C$ is not less than 5.5 atomic %, a modulation degree of not less than 45.0 is obtained. The effects that can be obtained by setting the modulation degree at not less than 40.0 or not less than 45.0 are as described above.

On the other hand, if the amount of the metal $M_C$ is not more than 27.5 atomic %, the recording power can be set to be not more than 22.8 mW. Moreover, if the amount of the metal $M_C$ is not more than 8.5 atomic %, the recording power can be set to be not more than 18.62 mW. If the recording power is not more than 22.8 mW, information signals can be recorded with respect to the recording layer 21 of the information signal layer Ln−1 by using an existing consumer drive. The reason for this is as follows. That is, assuming that the upper limit of the recording power of an existing consumer drive is 38.0 mW, and also assuming that the transmittance of the recording layer 21 of the information signal layer Ln that is nearest to the light irradiation surface C is not less than 60%, the recording power of laser light that is irradiated to the information signal layer Ln−1 is not more than 22.8 mW. Therefore, the recording power of the laser light for recording information signals with respect to the information signal layer Ln−1 is preferably set to be not more than 22.8 mW. It should be noted that the recording power of 38.0 mW is not the recording power of a semiconductor laser, but the recording power of laser light, which enters the light irradiation surface C or the information signal layer Ln of the optical recording medium 10.

If the recording power is not more than 18.62 mW, information signals can be recorded with respect to the recording layer 21 of the information signal layer Ln−2 by using an existing consumer drive. The reason for this is as follows. That is, assuming that the upper limit of the recording power of an existing consumer drive is 38.0 mW, and also assuming that the transmittance of the recording layer 21 of each of the information signal layers Ln and Ln−1 is not less than 70%, the recording power of laser light that is irradiated to the recording layer 21 of the information signal layer Ln−2 is not more than 18.62 mW. Therefore, the recording power of the laser light for recording information signals with respect to the recording layer 21 of the information signal layer Ln−2 is preferably set to be not more than 18.62 mW.

The recording layer 21 may further include an oxide of a metal $M_D$. The metal $M_D$ is at least one kind selected from the group consisting of copper (Cu) and zinc (Zn). By adding the oxide of the metal $M_D$, the amount of the oxide of the metal $M_A$ can be decreased, and the optical recording medium 10 can be produced at a lower cost.

The recording layer 21 may further include an oxide of a metal $M_E$. The metal $M_E$ is magnesium (Mg). By adding the oxide of the metal $M_E$, the refractive index of the recording layer 21 is decreased, and the thickness of the dielectric layer 22 that is provided adjacent to the upper surface of the recording layer 21 can be decreased. As a result, the optical recording medium 10 can be produced at a lower cost. The amount of Mg in the recording layer 21 is preferably not less than 6.6 atomic % and not more than 43.0 atomic %, more preferably, not less than 7.57 atomic % and not more than 43.0 atomic %, further preferably, not less than 20.1 atomic % and not more than 43.0 atomic %. If the amount of Mg is not less than 6.6 atomic %, the recording layer 21 is made to have a refractive index of not more than 2.24. When the refractive index is not more than 2.24, reflectance of not more than 4% is obtained in a condition in which the dielectric layer 22 that is provided adjacent to the upper surface of the recording layer 21 is thinned so as to be not more than 26 nm. By decreasing the reflectance as described above, the information signal layers L1 to Ln are easily made to have a similar reflectance. On the other hand, if the amount of Mg is not more than 43.0 atomic %, the recording layer 21 has a refractive index of not less than 1.97, and the reflectance of not less than 3.3% is obtained in a condition in which the thickness of the dielectric layer 22 is not less than 6 nm. When the reflectance is not less than 3.3%, a high S/N is obtained in reproducing of the recording layer 21 of the information signal layer Ln−1 by using an existing consumer drive. The reason for this is as follows. That is, in order to obtain a value of S/N that is sufficient for reproducing by using an existing consumer drive, the reflectance must be not less than 2%. Therefore, when the transmittance of the recording layer 21 of the information signal layer Ln that is nearest to the light irradiation surface C is set at not less than 60%, the information signal layer Ln−1 must have a reflectance of not less than 3.3%. Accordingly, the reflectance of the information signal layer Ln−1 is preferably not less than 3.3%.

The recording layer 21 may further include a metal $M_F$. The metal $M_F$ is at least one kind selected from the group consisting of tin (Sn), bismuth (Bi), germanium (Ge), cobalt (Co), aluminum (Al), indium (In), silver (Ag), palladium (Pd), gallium (Ga), tellurium (Te), vanadium (V), silicon (Si), tantalum (Ta), germanium (Ge), chromium (Cr), and terbium (Tb).

(Recording Layer of Information Signal Layer L0)

As the recording layer 21 of the information signal layer L0 that is arranged at the innermost side when viewed from the light irradiation surface C, a publicly known recording layer may be used. As the publicly known recording layer, for example, a recording layer containing an oxide of at least one metal selected from the group consisting of W and Mo and also containing an oxide of at least one metal selected from the group consisting of Cu, Mn, Ni, and Ag, a recording layer containing an oxide of Pd, and the like, may be used. Alternatively, a recording layer containing an oxide of the metal $M_A$, an oxide of the metal $M_B$, and an oxide of the metal $M_C$ may be used as in the case of the recording layers 21 of the information signal layers L1 to Ln.

(Dielectric Layer)

Since the dielectric layers 22 and 23 function as gas barrier layers, the durability of the recording layer 21 is improved. In addition, by preventing release of oxygen and infiltration of $H_2O$ in the recording layer 21, change in the film quality of the recording layer 21 (which is measured primarily by detecting decrease in the reflectance) is prevented, and the recording layer 21 maintains a necessary film quality.

The materials of the dielectric layers 22 and 23 include, for example, at least one kind selected from the group consisting of oxides, nitrides, sulfides, carbides, and fluorides. As the materials for the dielectric layers 22 and 23, materials that are the same or different from each other may be used. The oxides include, for example, oxides of at least one element selected from the group consisting of In, Zn, Sn, Al, Si, Ge, Ti, Ga, Ta, Nb, Hf, Zr, Cr, Bi, and Mg. The nitrides include, for example, nitrides of at least one element selected from the group consisting of In, Sn, Ge, Cr, Si, Al, Nb, Mo, Ti, Nb, Mo, Ti, W, Ta, and Zn, preferably, nitrides of at least one element selected from the group consisting of Si, Ge, and Ti. The sulfides include, for example, sulfides of Zn. The carbides include, for example, carbides of at least one element selected from the group consisting of In, Sn, Ge, Cr, Si, Al, Ti, Zr, Ta, and W, preferably, carbides of at least one element selected from the group consisting of Si, Ti, and W. The fluorides include, for example, fluorides of at least one element selected from the group consisting of Si, Al, Mg, Ca, and La. Combinations of these compounds include, for example, $ZnS$—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $In_2O_3$—$Ga_2O_3$—$ZnO$ (IGZO), $Sn_2O_3$—$Ta_2O_5$ (TTO), $TiO_2$—$SiO_2$, $Al_2O_3$—$ZnO$, $Al_2O_3$—$BaO$, etc.

(Middle Layer)

The middle layers S1 to Sn have a function of separating the information signal layers L0 to Ln from each other so as to have physical and optical sufficient distances, and the middle layers S1 to Sn have a grooved surface on their surfaces. The grooved surface has grooves with, for example, a concentric circular shape or a spiral shape (in-groove Gin and on-groove Gon). The thickness of the middle layers S1 to Sn is preferably set at 9 to 50 micrometers. The materials of the middle layers S1 to Sn are not particularly limited, but are preferably ultraviolet-curable acrylic resins. In addition, since the middle layers S1 to Sn are used as light paths of laser light for recording and reproducing information signals to the layers at the inner sides, the middle layers S1 to Sn preferably have sufficiently high light transmitting properties.

(Light Transmissive Layer)

The light transmissive layer 12 is a resin layer that is formed by curing a light sensitive resin such as an ultraviolet-curable resin. The material of the resin layer includes, for example, an ultraviolet-curable acrylic resin. In another case, the light transmissive layer 12 may be constructed of a light transmissive sheet with a circular ring shape and an adhesive layer for affixing the light transmissive sheet to the substrate 11. The light transmissive sheet is preferably made of a material that has a small absorbing function with respect to laser light to be used for recording and reproducing, and specifically, the light transmissive sheet is preferably made of a material having a transmittance of not less than 90%. As the material of the light transmissive sheet, for example, a polycarbonate resin material, a polyolefin resin (for example, "ZEONEX" (registered trademark)), etc., may be used. As the material of the adhesive layer, for example, an ultraviolet-curable resin, a pressure sensitive adhesive (PSA), etc., may be used.

The thickness of the light transmissive layer 12 is preferably selected from a range of not less than 10 micrometers and not more than 177 micrometers, and for example, the thickness of the light transmissive layer 12 may be 100 micrometers. By combining the light transmissive layer 12 having such a thin thickness and an objective lens that is made to have a high numerical aperture (NA) of, for example, approximately 0.85, high density recording is performed.

(Hard Coating Layer)

Additionally, although not shown in the figures, a hard coating layer may be further provided on the surface of the light transmissive layer 12 (light irradiation surface C) so as to protect the surface from mechanical impacts and damages and to maintain the quality of recording and reproducing of information signals even when dusts and fingerprints adhere to the surface while an user uses, for example. As the hard coating layer, a material containing fine power particles of silica gel for improving mechanical strength, or an ultraviolet-curable resin of solvent type or solventless type, may be used. The thickness is preferably set within a range of 1 micrometer to approximately several micrometers so that the hard coating layer have sufficient mechanical strength, water repellency, and oil repellency.

[2 Production Method of Optical Recording Medium]

Next, an example of a production method of an optical recording medium according to an embodiment of the present technique will be described.

(Step of Forming Substrate)

First, a substrate 11 having a grooved surface at one main surface of the substrate 11 is formed. As the method of forming the substrate 11, for example, an injection molding method, a photo polymerization method (2P method), and the like, may be used.

(Step of Forming Information Signal Layer L0)

Then, an information signal layer L0 is formed by laminating a dielectric layer 23, a recording layer 21, and a dielectric layer 22 on the substrate 11, in this order, by a sputtering method, for example.

(Step of Forming Middle Layer)

Next, an ultraviolet-curable resin is uniformly coated on the information signal layer L0 by a spin coating method, for example. Then, an uneven pattern of a stamper is pressed on the ultraviolet-curable resin that is uniformly coated on the information signal layer L0 and is then separated from the ultraviolet-curable rein after ultraviolet rays are irradiated to cure the ultraviolet-curable resin. Thus, the uneven pattern of the stamper is transferred to the ultraviolet-curable resin, and a middle layer S1, which is provided with, for example, in-grooves Gin and on-grooves Gon, is formed on the information signal layer L0.

(Step of Forming Information Signal Layer L1)

Next, an information signal layer L1 is formed by laminating a dielectric layer 23, a recording layer 21, and a dielectric layer 22 on the middle layer S1, in this order, by a sputtering method, for example. The step of forming each layer of the information signal layer L1 will be specifically described hereinafter.

First, the substrate 11 is carried into a vacuum chamber, which is provided with a target for forming a dielectric layer, and the vacuum chamber is evacuated to a predetermined pressure. Then, while a process gas such as an Ar gas and an $O_2$ gas is introduced into the vacuum chamber, a dielectric layer 23 is deposited on the substrate 11 by sputtering the target. As the sputtering method, for example, a radio frequency (RF) sputtering method or a direct current (DC) sputtering method may be used, but the direct current sputtering method is particularly preferably used. This is because the direct current sputtering method can be performed by using a less expensive device at a higher deposition rate compared with a case of using the ratio frequency sputtering method, whereby the productivity is improved while the production cost is decreased.

Next, the substrate 11 is carried into a vacuum chamber, which is provided with a target for depositing a recording layer, and the vacuum is evacuated to a predetermined pressure. Then, while a process gas such as an Ar gas and an $O_2$ gas is introduced into the vacuum chamber, a recording layer 21 is deposited on the dielectric layer 23 by sputtering the target.

As the target for depositing the recording layer, a metal target containing the metal $M_A$, the metal $M_B$, and the metal $M_C$ or a metal oxide target containing an oxide of the metal $M_A$, an oxide of the metal $M_B$, and an oxide of the metal $M_C$ is used, and the metal target is preferably used from the viewpoint of applicability of the direct current sputtering method in the deposition. Having a higher deposition rate compared with the deposition rate of the radio frequency sputtering method, the direct sputtering method improves the productivity. In the metal target and the metal oxide target, the atomic ratio ($M_A/M_B$) of the metal $M_A$ to the metal $M_B$ is preferably not less than 0.37 and not more than 1.31, more preferably, not less than 0.54 and not more than 0.78. In the metal target and the metal oxide target, the amount of the metal $M_C$ (=Zr) is preferably not less than 0.9 atomic % and not more than 27.5 atomic %, more preferably, not less than 0.9 atomic % and not more than 8.5 atomic %, further preferably, not less than 5.5 atomic % and not more than 8.5 atomic %.

The metal target may further include at least one kind selected from the group consisting of the metal $M_D$ and the metal $M_E$. Also, the metal oxide target may further include at least one kind selected from the group consisting of an oxide of the metal $M_D$ and an oxide of the metal $M_E$. The amount of the metal $M_E$ (=Mg) in the metal target and the metal oxide target is preferably not less than 6.6 atomic % and not more than 43.0 atomic %, more preferably, not less than 7.57 atomic % and not more than 43.0 atomic %, further preferably, not less than 20.1 atomic % and not more than 43.0 atomic %. The metal target may further include the metal $M_F$. Also, the metal oxide target may further include an oxide of the metal $M_F$.

Next, the substrate 11 is carried into a vacuum chamber, which is provided with a target for forming a dielectric layer, and the vacuum chamber is evacuated to a predetermined pressure. Then, while a process gas such as an Ar gas and an $O_2$ gas is introduced into the vacuum chamber, a dielectric layer 22 is deposited on the recording layer 21 by sputtering the target. As the sputtering method, for example, a radio frequency (RF) sputtering method or a direct current (DC) sputtering method may be used, but the direct current sputtering method is particularly preferably used. This is because the direct current sputtering method can be performed at a deposition rate that is higher than the deposition rate of the radio frequency sputtering method, whereby the productivity is improved. Thus, the information signal layer L1 is formed on the middle layer S1.

(Step of Forming Middle Layer)

Next, an ultraviolet-curable resin is uniformly coated on the information signal layer L1 by a spin coating method, for example. Then, an uneven pattern of a stamper is pressed on the ultraviolet-curable resin that is uniformly coated on the information signal layer L1 and is then separated from the ultraviolet-curable rein after ultraviolet rays are irradiated to cure the ultraviolet-curable resin. Thus, the uneven pattern of the stamper is transferred to the ultraviolet-curable resin, and a middle layer S2, which is provided with, for example, in-grooves Gin and on-grooves Gon, is formed on the information signal layer L1.

(Steps of Forming Information Signal Layers L2 to Ln and Middle Layers S3 to Sn)

Next, an information signal layer L2, a middle layer S2, an information signal layer L3, . . . , a middle layer Sn, and an information signal layer Ln are laminated on the middle layer S2, in this order, in the same manner as in the steps of forming the information signal layer L1 and the middle layer S2 described above.

(Step of Forming Light Transmissive Layer)

Next, a light sensitive resin such as an ultraviolet-curable resin (UV resin) is spin coated on the information signal layer Ln by a spin coating method, for example, and then light such as ultraviolet rays are irradiated to cure the light sensitive resin. Thus, a light transmissive layer 12 is formed on the information signal layer Ln.

According to the steps described above, a desired optical recording medium 10 is obtained.

[3 Advantageous Effects]

According to this embodiment, at least one recording layer 21 of the information signal layers L1 to Ln contains an oxide of the metal $M_A$, an oxide of the metal $M_B$, and an oxide of the metal $M_C$. The atomic ratio $(M_A/M_B)$ of the metal $M_A$ to the metal $M_B$ in the recording layer 21 is not less than 0.37 and not more than 1.31, and the amount of the metal $M_C$ in the recording layer 21 is within a range of not less than 0.9 atomic % and not more than 27.5 atomic %. Therefore, a high transmittance, a high recording sensitivity, and a high modulation degree (that is, a high S/N) are achieved.

[4 Modifications]

Although a case of the multiple information signal layers having the same layer structure is described in the above embodiment, the layer structure may be changed depending on characteristics (for example, optical characteristics and durability) in each of the information signal layers. It should be noted that all of the information signal layers are preferably configured to have the same layer structure from the viewpoint of the productivity.

Moreover, although the above embodiment describes a structure of the information signal layer, which has a recording layer, a dielectric layer that is provided adjacent to the upper surface of the recording layer, and a dielectric layer that is provided adjacent to the lower surface of the recording layer, the structure of the information signal layer is not limited thereto. For example, the dielectric layer may be provided only on one of the upper surface and the lower surface of the recording layer. In another example, the information signal layer may be constructed of only a single recording layer. By forming such a simple structure, the optical recording medium is produced at a lower cost, and the productivity is improved. This effect is greater in a medium having a greater number of the information signal layers.

The above embodiment describes an example of a case of applying the present technique to an optical recording medium, which is constructed by laminating the multiple information signal layers and the light transmissive layer on the substrate 11, in this order, and in which recording and reproducing of information signals are performed by irradiating the multiple information signal layers with laser light from the light transmissive layer side. However, the present technique is not limited to this example. The present technique can also be applied to other optical recording mediums. For example, an optical medium is constructed by laminating multiple information signal layers and a protective layer on a substrate, in this order, and recording and reproducing of information signals are performed by irradiating the multiple information signal layers with laser light from the substrate side. In another example, an optical recording medium is constructed by providing multiple information signal layers between two substrates, and recording and reproducing of information signals are performed by irradiating the multiple information signal layers with laser light from at least one side of the substrates.

In addition, although the above embodiment describes an example of a case, in which all of the multiple information signal layers include a write-once recording layer, the multiple information signal layers may further include a recording layer other than the write-once recording layer, in addition to the write-once recording layer.

EXAMPLES

The present technique will be specifically described by referring to examples hereinafter, but the present technique is not limited to the examples.

Examples 1 to 5 and Comparative Examples 1 to 3

First, a polycarbonate substrate with a thickness of 1.1 mm was molded by injection molding. In this case, a grooved surface having in-grooves and on-grooves was formed on the polycarbonate substrate. Then, a dielectric layer (substrate side), a recording layer, and a dielectric layer (light transmissive layer side) were laminated one by one on the grooved surface of the polycarbonate substrate by a sputtering method, whereby a first information signal layer (hereinafter called a "L0 layer") was formed.

The structure of each of the layers of the L0 layer is described as follows.
Dielectric layer (substrate side)
Material: ITO
Thickness: 10 nm
Recording layer
Material: Pd—W—Zn—Cu—O
Thickness: 35 nm
Dielectric layer (light transmissive layer side)
Material: ITO
Thickness: 10 nm Next, an ultraviolet-curable resin was uniformly coated on the L0 layer by a spin coating method. Thereafter, an uneven pattern of a stamper was pressed on the ultraviolet-curable resin that was uniformly coated on the L0 layer, and then the stamper was separated from the ultraviolet-curable resin after ultraviolet rays were irradiated to cure the ultraviolet-curable resin. Thus, a middle layer having a thickness of 15 micrometers and having in-grooves and on-grooves was formed.

Then, a second information signal layer (hereinafter called a "L1 layer") was formed by laminating a dielectric layer (substrate side), a recording layer, and a dielectric layer (light transmissive layer side) on the middle layer one by one.

The structure of each of the layers of the L1 layer is described as follows.

Dielectric layer (substrate side)
Material: ITO
Thickness: 10 nm
Recording layer
Material: Mn—W—Zr—O
Thickness: 35 nm
Dielectric layer (light transmissive layer side)
Material: ITO
Thickness: 10 nm This recording layer was deposited as follows. The deposition was performed by co-sputtering a Mn target, a W target, and a Zr target in a mixed gas atmosphere of an Ar gas and an $O_2$ gas. In the forming of the recording layer, electric power to be supplied to each of the targets was adjusted so that the atomic ratio "a/b" of Mn to W and the amount "c" of Zr in the recording layer be the ratios as shown in Table 1. Here, the symbol "a" represents the amount of the metal $M_A$ (=Mn) in the recording layer, and the symbol "b" represents the amount of the metal $M_B$ (=W) in the recording layer. In addition, the flow ratio of the Ar gas and the $O_2$ gas was adjusted so as to obtain a mixed gas atmosphere having a high concentration of oxygen.

Specific conditions for forming the recording layer are described below.

Flow rate of Ar gas: 10 to 15 sccm
Flow rate of $O_2$ gas: 15 to 24 sccm
Electric power supplied: 100 to 200 W Next, an ultraviolet-curable resin was uniformly coated on the L1 layer by a spin coating method and was irradiated with ultraviolet rays so as to be cured, whereby a light transmissive layer having a thickness of 85 micrometers was formed.

Thus, each of target optical recording mediums was obtained.

Examples 6 to 10 and Comparative Examples 4 and 5

Each of optical recording mediums was obtained in the same manner as in the case of the example 1 except that the recording layer of the L1 layer was formed by adjusting electric power to be supplied to each of the targets so that the atomic ratio "a/b" of Mn to W and the amount "c" of Zr in the recording layer be the ratios as shown in Table 2.

Examples 11 and 12

The recording layer of the L1 layer was formed by using a Ni target, a W target, and a Zr target so as to be made of Ni—W—Zr—O. In the forming of this recording layer, electric power to be supplied to each of the targets was adjusted so that the atomic ratio "a/b" of Ni to W and the amount "c" of Zr in the recording layer be the ratios as shown in Table 3. Then, each of optical recording mediums was obtained in the same manner as in the case of the example 1 except for the adjustment of the electric power.

Comparative Example 6

The recording layer of the L1 layer was formed by using a Ag target, a W target, and a Zr target so as to be made of Ag—W—Zr—O. In the forming of this recording layer, electric power to be supplied to each of the targets was adjusted so that the atomic ratio "a/b" of Ag to W and the amount "c" of Zr in the recording layer be the ratios as shown in Table 3. Then, an optical recording medium was obtained in the same manner as in the case of the example 1 except for the adjustment of the electric power.

Comparative Example 7

The recording layer of the L1 layer was formed by using a Co target, a W target, and a Zr target so as to be made of Co—W—Zr—O. In the forming of this recording layer, electric power to be supplied to each of the targets was adjusted so that the atomic ratio "a/b" of Co to W and the amount "c" of Zr in the recording layer be the ratios as shown in Table 3. Then, an optical recording medium was obtained in the same manner as in the case of the example 1 except for the adjustment of the electric power.

Examples 11 and 12

The recording layer of the L1 layer was formed by using a Mn target, a Mo target, and a Zr target so as to be made of Mn—Mo—Zr—O. In the forming of this recording layer, electric power to be supplied to each of the targets was adjusted so that the atomic ratio "a/b" of Mn to Mo and the amount "c" of Zr in the recording layer be the ratios as shown in Table 3. Then, each of optical recording mediums was obtained in the same manner as in the case of the example 1 except for the adjustment of the electric power.

Comparative Example 8

The recording layer of the L1 layer was formed by using a Mn target, a Ta target, and a Zr target so as to be made of Mn—Ta—Zr—O. In the forming of this recording layer, electric power to be supplied to each of the targets was adjusted so that the atomic ratio "a/b" of Mn to Ta and the amount "c" of Zr in the recording layer be the ratios as shown in Table 3. Then, an optical recording medium was obtained in the same manner as in the case of the example 1 except for the adjustment of the electric power.

Comparative Example 9

The recording layer of the L1 layer was formed by using a Mn target, a V target, and a Zr target so as to be made of Mn—V—Zr—O. In the forming of this recording layer, electric power to be supplied to each of the targets was adjusted so that the atomic ratio "a/b" of Mn to V and the amount "c" of Zr in the recording layer be the ratios as shown in Table 3. Then, an optical recording medium was obtained in the same manner as in the case of the example 1 except for the adjustment of the electric power.

Example 15

The recording layer of the L1 layer was formed by using a Mn target, a W target, a Zr target, a Cu target, and a Zn target so as to be made of Mn—W—Zr—Cu—Zn—O. In the forming of this recording layer, electric power to be supplied to each of the targets was adjusted so that the atomic ratio "a/b" of Mn to W, the amount "c" of Zr, and the amounts "d($d_1$, $d_2$)" of Cu and Zn in the recording layer be the ratios as shown in Table 4. Then, an optical recording medium was obtained in the same manner as in the case of the example 1 except for the adjustment of the electric power.

Examples 16 to 20

The recording layer of the L1 layer was formed by using a Mn target, a W target, a Zr target, a Cu target, a Zn target, and a Mg target so as to be made of Mn—W—Zr—Cu—Zn—Mg—O. In the forming of this recording layer, electric power to be supplied to each of the targets was adjusted so that the atomic ratio "a/b" of Mn to W, the amount "c" of Zr, the amounts "d($d_1$, $d_2$)" of Cu and Zn, and the amount "e" of Mg in the recording layer be the ratios as shown in Table 4. Then, each of optical recording mediums was obtained in the same manner as in the case of the example 1 except for the adjustment of the electric power.

(Evaluation)

The following measurement was performed with respect to the L1 layer of the optical recording medium of each of the examples 1 to 20 and the comparative examples 1 to 9, which were obtained as described above.

(Transmittance)

The transmittance of the L1 layer was measured with respect to a recording wavelength of 405 nm by using a spectrophotometer (manufactured by JASCO corporation, Product name: V-530).

(Recording Power)

Data of 1-7 modulation type was recorded and was reproduced at a recording wavelength of 405 nm, a recording linear rate of 7.69 m/s, and a density of 32 GB per one layer by using a disk tester (manufactured by Pulstec Industrial Co., Ltd., Product name: ODU-1000), whereby a value of i-MLSE was measured. The value of the i-MLSE was calculated with respect to the recording power. Then, a lower value and a higher value of the recording power that exceeded 14% were respectively represented by Pwl and Pwh, and a middle of the values of Pwl and Pwh was used as a recording power (optimum recording power) Pwo. In this case, an i-MLSE of 14% is an upper limit of the i-MLSE when error correction is appropriately performed, and it is expected that reproduced data includes defects and signal quality is greatly degraded if the value of the i-MLSE exceeds 14%. Here, the recording power is not the recording power of a semiconductor laser, but the recording power of laser light, which enters the L1 layer.

(Modulation Degree)

Data of 1-7 modulation type was recorded and was reproduced at a recording wavelength of 405 nm, a recording linear rate of 7.69 m/s, and a density of 32 GB per one layer by using a disk tester (manufactured by Pulstec Industrial Co., Ltd., Product name: ODU-1000), whereby a modulation degree (signal amplitude ratio) was measured.

(Refractive Index)

The refractive index of the recording layer was measured as follows. First, a thin film, which had the same composition as the recording layer of the L1 layer, was deposited on a Si wafer by the sputtering method, whereby a sample for evaluation was prepared. Then, a refractive index "n" was measured by making laser light with a wavelength of 405 nm vertically enter a surface of the film of the sample by using a spectroscopic ellipsometer (manufactured by J.A. woollam co., Product name: VASE series Ellipsometers (HS-190 monochromator)).

(Overall Evaluation)

The L1 layer of the optical recording medium of each of the examples 1 to 14 and the comparative examples 1 to 9 was evaluated based on the following criteria by using results of the measurement of the transmittance, the recording power, and the modulation degree.

Excellent: T is greater than or equal to 70.0%, Pwo is less than or equal to 18.62 mW, M is greater than or equal to 45.0

Good: T is greater than or equal to 60.0% and less than 70.0%, Pwo is greater than 18.62 mW and less than or equal to 22.8 mW, M is greater than or equal to 40.0 and less than 45.0

Poor: T is less than 60.0%, Pwo is greater than 22.8 mW, M is less than 40.0

Here, the symbol "T" represents a transmittance, the symbol "Pwo" represents recording power, and the symbol "M" represents a "modulation degree".

(Overall Evaluation)

The L1 layer of the optical recording medium of each of the examples 15 to 20 was evaluated based on the following criteria by using results of the measurement of the transmittance, the recording power, and the modulation degree.

Excellent[+]: T is greater than or equal to 70.0%, Pwo is less than or equal to 22.8 mW, M is greater than or equal to 45.0, n is greater than or equal to 1.970 and less than or equal to 2.240

Excellent[−]: T is greater than or equal to 70.0%, Pwo is less than or equal to 22.8 mW, M is greater than or equal to 45.0, n is less than 1.970 or greater than 2.240

Table 1 shows the composition of the recording layer included in the L1 layer and results of evaluating the L1 layer of the optical recording medium of each of the examples 1 to 5 and the comparative examples 1 to 3.

TABLE 1

|  | Metal $M_A$ Material | Metal $M_B$ Material | Metal $M_C$ Material | Atomic ratio c [atomic %] | a/b ($M_A/M_B$) [—] | Transmittance [%] | Pwo [mW] | Modulation degree | Evaluation |
|---|---|---|---|---|---|---|---|---|---|
| Example 1 | Mn | W | Zr | 5.0 | 1.09 | 64.2 | 11.68 | 60.7 | Good |
| Example 2 | Mn | W | Zr | 5.0 | 0.74 | 70.4 | 15.02 | 51.0 | Excellent |
| Example 3 | Mn | W | Zr | 5.0 | 0.57 | 73.5 | 16.69 | 46.1 | Excellent |
| Example 4 | Mn | W | Zr | 5.0 | 0.72 | 70.4 | 15.73 | 50.5 | Excellent |
| Example 5 | Mn | W | Zr | 5.0 | 0.46 | 76.8 | 17.73 | 42.2 | Good |
| Comparative example 1 | Mn | W | Zr | 5.0 | 1.43 | 58.0 | 8.34 | 70.3 | Poor |
| Comparative example 2 | Mn | W | Zr | 5.0 | 0.33 | 80.0 | 18.73 | 38.0 | Poor |

TABLE 1-continued

| | Metal $M_A$ Material | Metal $M_B$ Material | Metal $M_C$ Material | Atomic ratio c [atomic %] | a/b $(M_A/M_B)$ [—] | Transmittance [%] | Pwo [mW] | Modulation degree | Evaluation |
|---|---|---|---|---|---|---|---|---|---|
| Comparative example 3 | Mn | W | Zr | 5.0 | 0.35 | 77.3 | 18.78 | 39.9 | Poor |

Figure 3:
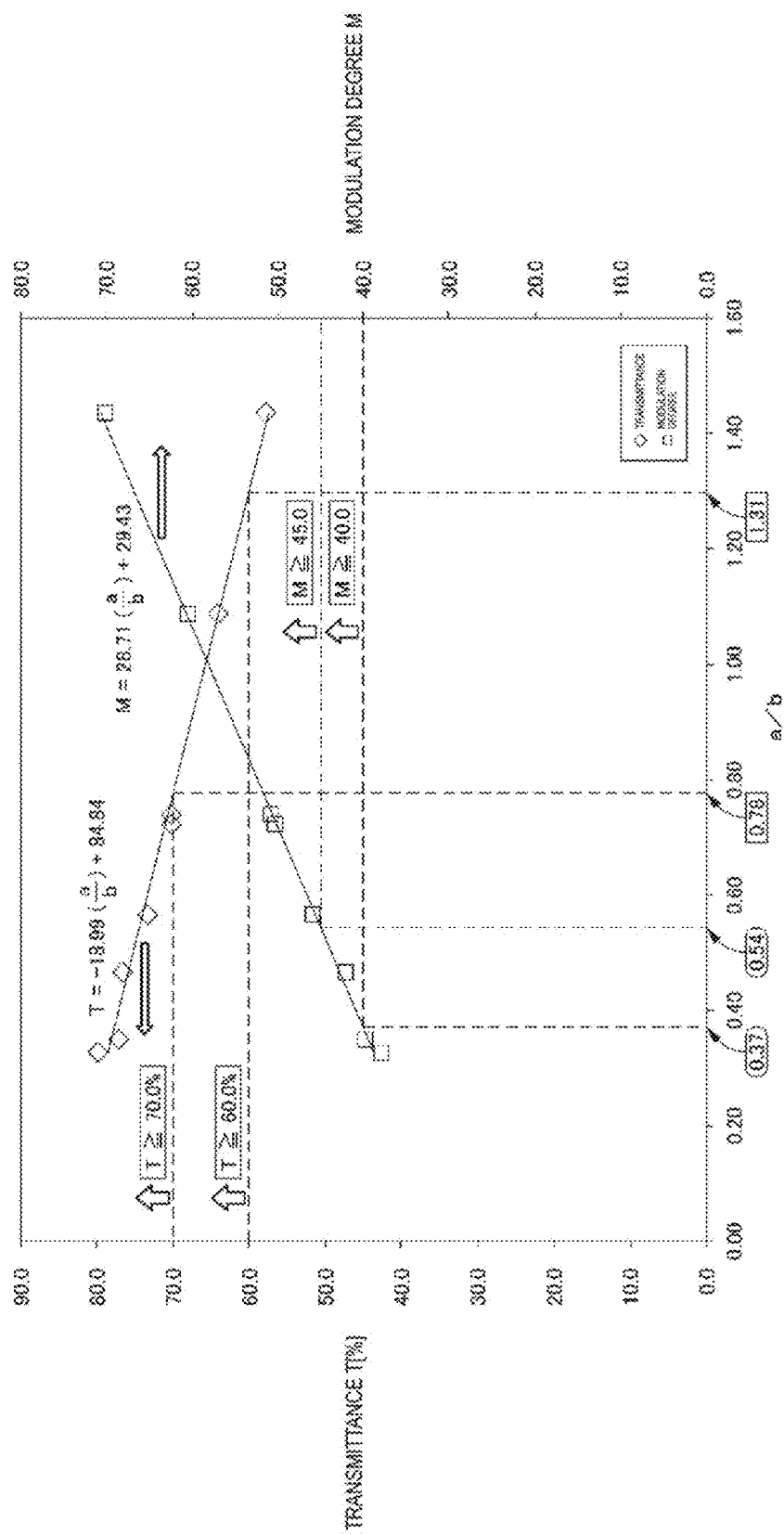
FIG. 3 is a graph showing a transmittance and a modulation degree of an L1 layer of an optical recording medium of each of examples 1 to 5 and comparative examples 1 to 3.

FIG. 3 shows the transmittance and the modulation degree of the L1 layer of the optical recording medium of each of the examples 1 to 5 and the comparative examples 1 to 3. It should be noted that the approximation straight lines "T" and "M" shown in FIG. 3 were calculated by linear approximation using a least squares method.

Table 2 shows the composition of the recording layer included in the L1 layer and results of evaluating the L1 layer of the optical recording medium of each of the examples 6 to 10 and the comparative examples 4 and 5.

TABLE 2

| | Metal $M_A$ Material | Metal $M_B$ Material | Metal $M_C$ Material | Atomic ratio c [atomic %] | a/b $(M_A/M_B)$ [—] | Transmittance [%] | Pwo [mW] | Modulation degree | Evaluation |
|---|---|---|---|---|---|---|---|---|---|
| Example 6 | Mn | W | Zr | 3.0 | 0.44 | 73.0 | 17.39 | 42.3 | Good |
| Example 7 | Mn | W | Zr | 4.8 | 0.44 | 74.1 | 17.78 | 44.2 | Good |
| Example 8 | Mn | W | Zr | 8.0 | 0.44 | 76.2 | 18.47 | 47.7 | Excellent |
| Example 9 | Mn | W | Zr | 10.0 | 0.44 | 77.5 | 18.90 | 49.8 | Good |
| Example 10 | Mn | W | Zr | 20.0 | 0.44 | 83.9 | 21.06 | 60.5 | Good |
| Comparative example 4 | Mn | W | Zr | 0.0 | 0.44 | 71.0 | 16.74 | 39.1 | Poor |
| Comparative example 5 | Mn | W | Zr | 30.0 | 0.44 | 90.4 | 23.21 | 71.2 | Poor |

Figure 4:
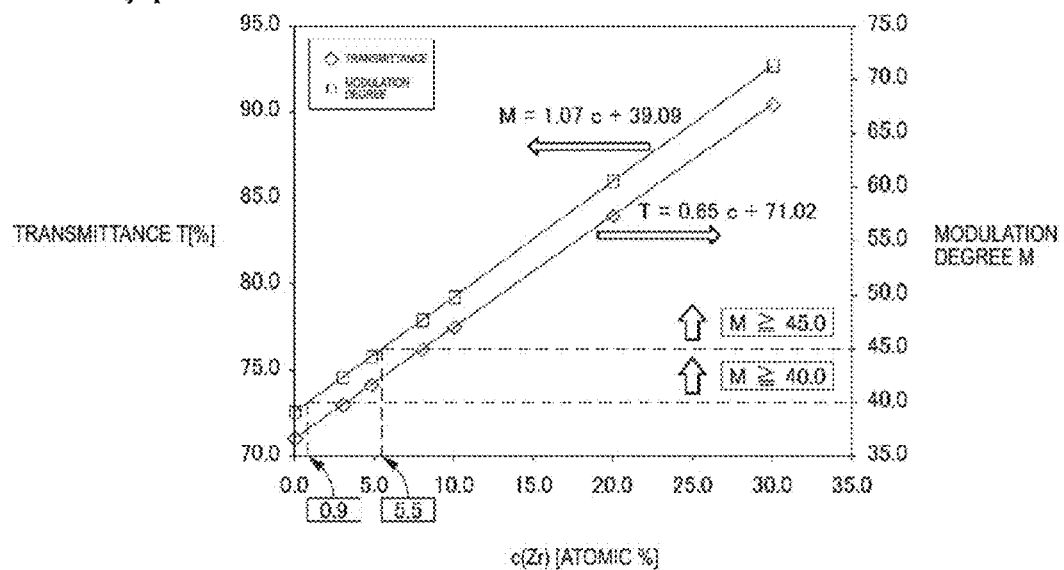
FIG. 4A is a graph showing a transmittance and a modulation degree of an L1 layer of an optical recording medium of each of examples 6 to 10 and comparative examples 4 and 5.
FIG. 4B is a graph showing recording power of the L1 layer of the optical recording medium of each of the examples 6 to 10 and the comparative examples 4 and 5.
Figure 4:
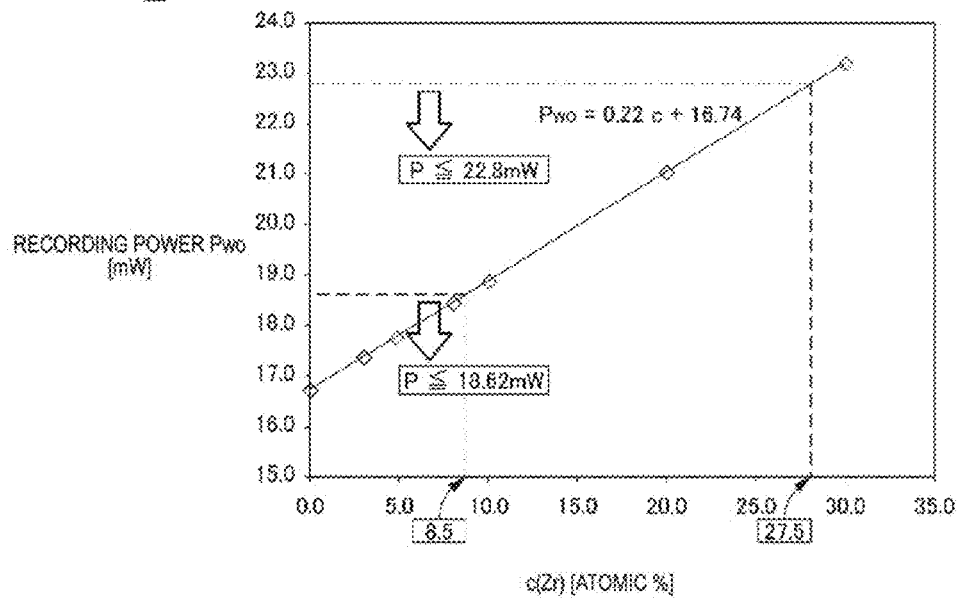

FIG. 4A shows the transmittance and the modulation degree of the L1 layer of the optical recording medium of each of the examples 6 to 10 and the comparative examples 4 and 5. FIG. 4B shows the recording power of the recording layer included in the L1 layer of the optical recording medium of each of the examples 6 to 10 and the comparative examples 4 and 5. It should be noted that the approximation straight lines "T", "M", and "$P_{wo}$" shown in FIG. 4A and FIG. 4B were calculated by linear approximation using a least squares method.

Table 3 shows the composition of the recording layer included in the L1 layer and results of the evaluation of the optical recording medium of each of the examples 11 to 14 and the comparative examples 6 to 9.

TABLE 3

| | Metal $M_A$ Material | Metal $M_B$ Material | Metal $M_C$ Material | Atomic ratio c [atomic %] | a/b $(M_A/M_B)$ [—] | Transmittance [%] | Pwo [mW] | Modulation degree | Evaluation |
|---|---|---|---|---|---|---|---|---|---|
| Example 11 | Ni | W | Zr | 5.0 | 0.78 | 77.3 | 12.21 | 52.2 | Excellent |
| Example 12 | Ni | W | Zr | 5.0 | 0.72 | 79.8 | 16.74 | 51.0 | Excellent |
| Comparative example 6 | Ag | W | Zr | 5.0 | 0.78 | 68.0 | 9.75 | 38.9 | Poor |
| Comparative example 7 | Co | W | Zr | 5.0 | 0.78 | 73.0 | 17.15 | 35.2 | Poor |
| Example 13 | Mn | Mo | Zr | 5.0 | 0.94 | 69.5 | 15.24 | 54.7 | Good |
| Example 14 | Mn | Mo | Zr | 5.0 | 0.72 | 72.6 | 16.91 | 49.9 | Excellent |
| Comparative example 8 | Mn | Ta | Zr | 5.0 | 0.78 | 73.0 | 16.12 | 38.5 | Poor |
| Comparative example 9 | Mn | V | Zr | 5.0 | 0.78 | 75.0 | 16.88 | 35.2 | Poor |

Table 4 shows the composition of the recording layer included in the L1 layer of the optical recording medium of each of the examples 15 to 20.

TABLE 4

| | Metal $M_A$ Material | Metal $M_B$ Material | Metal $M_C$ | | Metal $M_D$ | | Metal $M_E$ | | a/b |
| | | | Material | Atomic ratio c [atomic %] | Material | Atomic ratio d (d1/d2) [atomic %] | Material | Atomic ratio e [atomic %] | ($M_A/M_B$) [—] |
|---|---|---|---|---|---|---|---|---|---|
| Example 15 | Mn | W | Zr | 5.0 | Cu/Zn | 16.0/48.0 | Mg | 0.0 | 0.72 |
| Example 16 | Mn | W | Zr | 5.0 | Cu/Zn | 16.0/33.0 | Mg | 5.0 | 0.72 |
| Example 17 | Mn | W | Zr | 5.0 | Cu/Zn | 16.0/33.0 | Mg | 10.0 | 0.72 |
| Example 18 | Mn | W | Zr | 5.0 | Cu/Zn | 16.0/33.0 | Mg | 15.0 | 0.72 |
| Example 19 | Mn | W | Zr | 5.0 | Cu/Zn | 16.0/33.0 | Mg | 20.0 | 0.72 |
| Example 20 | Mn | W | Zr | 5.0 | Cu/Zn | 16.0/33.0 | Mg | 25.0 | 0.72 |

Table 5 shows the results of evaluating the L1 layer of the optical recording medium of each of the examples 15 to 20.

TABLE 5

| | Transmittance [%] | Pwo [mW] | Modulation degree [—] | Refractive index [—] | Evaluation |
|---|---|---|---|---|---|
| Example 15 | 70.4 | 15.73 | 50.5 | 2.294 | Excellent⁻ |
| Example 16 | 70.4 | 15.20 | 51.0 | 2.252 | Excellent⁻ |
| Example 17 | 70.5 | 14.66 | 51.5 | 2.215 | Excellent⁺ |
| Example 18 | 70.5 | 14.07 | 52.1 | 2.165 | Excellent⁺ |
| Example 19 | 70.5 | 13.59 | 52.5 | 2.141 | Excellent⁺ |
| Example 20 | 70.6 | 13.06 | 53.0 | 2.112 | Excellent⁺ |

Figure 5:
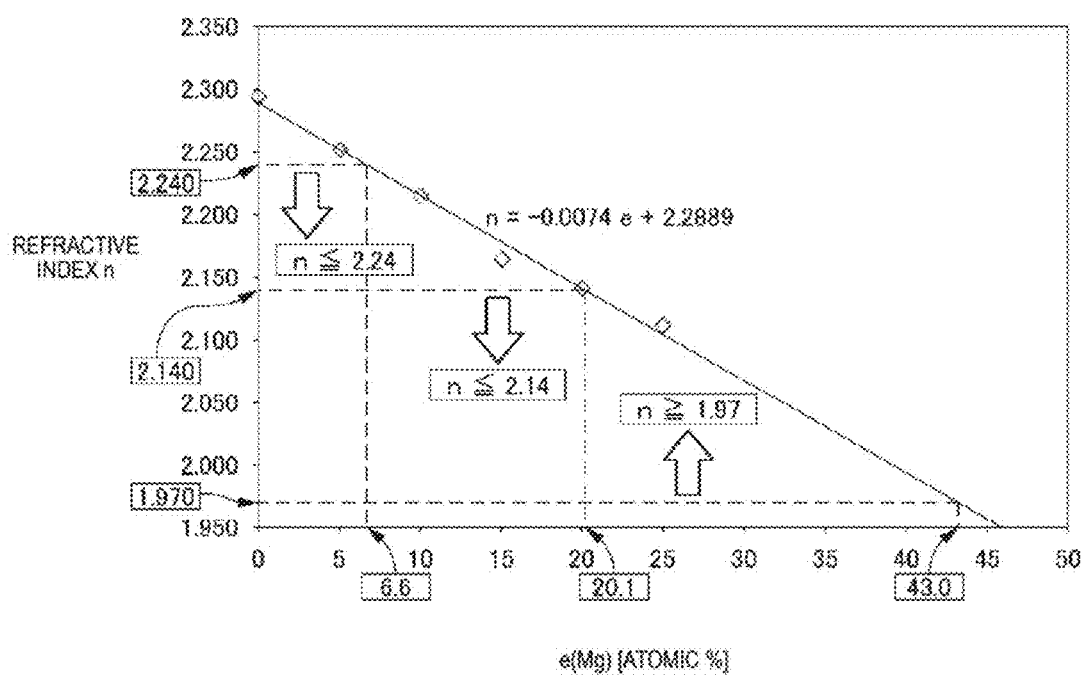
FIG. 5 is a graph showing a refractive index of a recording layer that is included in an L1 layer of an optical recording medium of each of examples 15 to 20.

FIG. 5 shows the refractive index of the recording layer included in the L1 layer of the optical recording medium of each of the examples 15 to 20. It should be noted that the approximation straight line "n" shown in FIG. 5 was calculated by linear approximation using a least squares method.

Here, the symbols "a", "b", "d", and "e" shown in Tables 1 to 4 represent contents as follows.

a/b: a ratio (an atomic ratio) of the metal $M_A$ to the metal $M_B$ in the recording layer c: an amount (atomic %) of the metal $M_C$ in the recording layer (It should be noted that the symbol "c" represents an atomic ratio (atomic %) of the metal $M_C$ to the total amount of the metal $M_A$, the metal $M_B$, and the metal $M_C$ in Tables 1 to 3.)

d: an amount (atomic %) of the metal $M_D$ in the recording layer (Specifically, the symbol "$d_1$" represents an amount (atomic %) of Cu in the recording layer, and the symbol "$d_2$" represents an amount (atomic %) of Zn in the recording layer.)

e: an amount (atomic %) of the metal $M_E$ in the recording layer

Regarding the metals $M_A$ and $M_B$, since the ratio (atomic ratio) of the metal $M_A$ to the metal $M_B$ is more important than the amounts of the metal $M_A$ and the metal $M_B$ in the recording layer, for the characteristics of the medium, the ratio (atomic ratio) of the metal $M_A$ to the metal $M_B$ is shown in Tables 1 to 4. In contrast, regarding the metals $M_C$, $M_D$, and $M_E$, except for the metals $M_A$ and $M_B$, the amounts of the metals $M_C$, $M_D$, and $M_E$ in the recording layer are important for the characteristics of the medium, and therefore, the amounts of these metals are shown in Tables 1 to 4.

As shown by the approximation straight line "T" in FIG. 3, the value of "a/b" is preferably set to be less than or equal to 1.31 so that the value of "T" be greater than or equal to 60.0%, and the value of "a/b" is preferably set to be less than or equal to 0.78 so that the value of "T" be greater than or equal to 70.0%.

As shown by the approximation straight line "M" in FIG. 3, the value of "a/b" is preferably set to be greater than or equal to 0.37 so that the value of "M" be greater than or equal to 40.0, and the value of "a/b" is preferably set to be greater than or equal to 0.54 so that the value of "M" be greater than or equal to 45.

Accordingly, the value of "a/b" is preferably set to be greater than or equal to 0.37 and less than or equal to 1.31 so that the transmittance "T" be greater than or equal to 60.0% and that the modulation degree of "M" be greater than or equal to 40.0, and the value of "a/b" is preferably set to be greater than or equal to 0.54 and less than or equal to 0.78 so that the transmittance "T" be greater than or equal to 70.0% and that the modulation degree of "M" be greater than or equal to 45.0.

As shown by the approximation straight line "M" in FIG. 4A, the amount "c" of Zr in the recording layer is preferably set to be greater than or equal to 0.9 atomic % so that the value of "M" be greater than or equal to 40.0, and the amount "c" of Zr in the recording layer is preferably set to be greater than or equal to 5.5 atomic % so that the value of "M" be greater than or equal to 45.0.

As shown by the approximation straight line "$P_{wo}$" in FIG. 4B, the amount "c" of Zr in the recording layer is preferably set to be less than or equal to 27.5 atomic % so that the value of "$P_{wo}$" be less than or equal to 22.8 mW, and the amount "c" of Zr in the recording layer is preferably set to be less than or equal to 8.5 atomic % so that the value of "$P_{wo}$" be less than or equal to 18.62 mW.

Accordingly, the amount "c" of Zr in the recording layer is preferably set to be greater than or equal to 0.9 atomic % and less than or equal to 27.5 atomic % so that the modulation degree "M" be greater than or equal to 40.0 and that the recording power "$P_{wo}$" be less than or equal to 22.8 mW, and the amount "c" of Zr in the recording layer is preferably set to be greater than or equal to 5.5 atomic % and less than or equal to 8.5 atomic % so that the modulation degree "M" be greater than or equal to 45 and that the recording power "$P_{wo}$" be less than or equal to 18.62 mW.

As shown by the results of the evaluation of the examples 11 and 12 in Table 3, the transmittance "T", the recording power "$P_{wo}$", and the modulation degree "M" can be greater than or equal to 60%, less than or equal to 22.8 mW, and greater than or equal to 40.0, respectively, in the case of using Ni as the metal $M_A$, instead of Mn.

As shown by the results of the evaluation of the comparative examples 6 and 7 in Table 3, the transmittance "T" and the recording power "$P_{wo}$" can be greater than or equal to 60.0% and less than or equal to 22.8 mW, respectively, but it is difficult to obtain a modulation degree "M" of greater than or equal to 40.0, in the case of using Ag or Co as the metal $M_A$, instead of Mn.

As shown by the results of the evaluation of the examples 13 and 14 in Table 3, the transmittance "T", the recording power "$P_{wo}$", and the modulation degree "M" can be greater than or equal to 60%, less than or equal to 22.8 mW, and greater than or equal to 40.0, respectively, in the case of using Mo as the metal $M_B$, instead of W.

As shown by the results of the evaluation of the comparative examples 8 and 9 in Table 3, the transmittance "T" and the recording power "$P_{wo}$" can be greater than or equal to 60.0% and less than or equal to 22.8 mW, respectively, but it is difficult to obtain a modulation degree "M" of greater than or equal to 40.0, in the case of using Ta or V as the metal $M_B$, instead of W.

As shown by the results of the evaluation of the examples 4 and 15, which are shown in Tables 1 and 4, respectively, characteristics of the transmittance "T", the recording power "$P_{wo}$", and the modulation degree "M" are not greatly affected even when Cu and Zn are further added as the metal $M_D$ in the recording layer.

As shown by the results of the evaluation of the examples 15 to 20 in Table 4, when Mg is further added as the metal $M_E$ in the recording layer, the refractive index of the recording layer is decreased. In addition, the refractive index tends to be decreased in accordance with the increase in the amount of Mg in the recording layer.

As shown by the approximation straight line "n" in FIG. 5, the amount "e" of Mg in the recording layer is preferably set to be not less than 6.6 atomic % so that the refractive index be not more than 2.240, and the amount "e" of Mg in the recording layer is preferably set to be not less than 20.1 atomic % so that the refractive index be not more than 2.140. Moreover, the amount "e" of Mg in the recording layer is preferably set to be not less than 43.0 atomic % so that the refractive index be not more than 1.97.

Example 21

An optical recording medium was obtained in the same manner as in the example 1 except that the recording layer of the L1 layer was formed by adjusting electric power to be supplied to each of the targets so that the atomic ratio "a1/b1" of Mn to W and the amount "c" of Zr in the recording layer be the values shown in Table 6.

Examples 22 to 24

The recording layer of the L1 layer was formed by using a Mn target, a Ni target, a W target, and a Zr target so as to be made of Mn—Ni—W—Zr—O. In the forming of this recording layer, electric power to be supplied to each of the targets was adjusted so that the atomic ratio "(a1+a2)/b1" of the total amount of Mn and Ni to W and the amount "c" of Zr in the recording layer be the ratios shown in Table 6. Then, each of optical recording mediums was obtained in the same manner as in the case of the example 21 except for the adjustment of the electric power.

Example 25

The recording layer of the L1 layer was formed by using a Ni target, a W target, and a Zr target so as to be made of Ni—W—Zr—O. In the forming of this recording layer, electric power to be supplied to each of the targets was adjusted so that the atomic ratio "a2/b1" of Ni to W and the amount "c" of Zr in the recording layer be the ratios shown in Table 6. Then, an optical recording medium was obtained in the same manner as in the case of the example 21 except for the adjustment of the electric power.

Examples 26 and 27

The recording layer of the L1 layer was formed by using a Mn target, a Ni target, a W target, and a Zr target so as to be made of Mn—Ni—W—Zr—O. In the forming of this recording layer, electric power to be supplied to each of the targets was adjusted so that the atomic ratio "(a1+a2)/b1" of the total amount of Mn and Ni to W and the amount "c" of Zr in the recording layer be the ratios shown in Table 6. Then, each of optical recording mediums was obtained in the same manner as in the case of the example 4 except for the adjustment of the electric power.

It should be noted that the deposition conditions were adjusted so that the amount "a" ($=a_1+a_2$) of the metal $M_A$ be the same in the implementation 21 to 25 in Table 6. Also, the deposition conditions were adjusted so that the amount "a" ($=a_1+a_2$) of the metal $M_A$ be the same in the examples 4, 12, 26, and 27 in Table 6.

Example 28

An optical recording medium was obtained in the same manner as in the example 1 except that the recording layer of the L1 layer was formed by adjusting electric power to be supplied to each of the targets so that the atomic ratio "$a_1/b_1$" of Mn to W and the amount "c" of Zr in the recording layer be the values shown in Table 8.

Examples 29 and 30

The recording layer of the L1 layer was formed by using a Mn target, a W target, a Mo target, and a Zr target so as to be made of Mn—W—Mo—Zr—O. In the forming of this recording layer, electric power to be supplied to each of the targets was adjusted so that the atomic ratio "$a_1/(b_1+b_2)$" of Mn to the total amount of W and Mo and the amount "c" of Zr in the recording layer be the ratios shown in Table 8. Then, each of optical recording mediums was obtained in the same manner as in the case of the example 28 except for the adjustment of the electric power.

Examples 31 and 32

The recording layer of the L1 layer was formed by using a Mn target, a W target, a Mo target, and a Zr target so as to be made of Mn—W—Mo—Zr—O. In the forming of this recording layer, electric power to be supplied to each of the targets was adjusted so that the atomic ratio "$a_1/(b_1+b_2)$" of Mn to the total amount of W and Mo and the amount "c" of Zr in the recording layer be the ratios shown in Table 8. Then, each of optical recording mediums was obtained in the same manner as in the case of the example 4 except for the adjustment of the electric power.

It should be noted that the deposition conditions were adjusted so that the amount "b" ($=b_1+b_2$) of the metal $M_B$ be the same in the examples 4, 13, 14, and 28 to 32 in Table 8.

Examples 33 and 34

The recording layer of the L1 layer was formed by using a Mn target, a Ni target, a W target, a Mo target, and a Zr target so as to be made of Mn—Ni—W—Mo—Zr—O. In the forming of this recording layer, electric power to be supplied to each of the targets was adjusted so that the atomic ratio "$(a_1+a_2)/(b_1+b_2)$" of the total amount of Mn and Ni to the total amount of W and Mo and the amount "c" of Zr in the recording layer be the ratios shown in Table 10. Then, each of optical recording mediums was obtained in the same manner as in the case of the example 21 except for the adjustment of the electric power.

(Evaluation)

The L1 layer of the optical recording medium of each of the examples 4, 12 to 14, and 21 to 34 obtained as described above was evaluated as follows.

(Transmittance)

The transmittance "T" of the L1 layer was measured in the same manner as in the example 1. Then, the L1 layer of the optical recording medium of each of the examples 4, 12 to 14, and 21 to 34 was evaluated based on the following criteria by using the measured transmittance "T".
Excellent: T is greater than or equal to 70.0%
Good: T is greater than or equal to 60.0% and less than 70.0%
Poor: T is less than 60.0%

(Recording Power)

The recording power (optimum recording power) Pwo of the L1 layer was measured in the same manner as in the example 1. Then, the L1 layer of the optical recording medium of each of the examples 4, 12 to 14, and 21 to 34 was evaluated based on the following criteria by using the measured recording power Pwo.
Excellent: Pwo is less than or equal to 18.62 mW
Good: wo is greater than 18.62 mW and less than or equal to 22.8 mW
Poor: wo is greater than 22.8 mW (Modulation Degree)

The modulation degree (signal amplitude ratio) "M" of the L1 layer was measured in the same manner as in the example 1. Then, the L1 layer of the optical recording medium of each of the examples 4, 12 to 14, and 21 to 34 was evaluated based on the following criteria by using the measured recording power Pwo.
Excellent: M is greater than or equal to 45.0
Good: M is greater than or equal to 40.0 and less than 45.0
Poor: M is less than 40.0

(Power Margin)

A power margin PM was measured with respect to a random symbol error rate (SER) of the optical recoding medium as follows. First, the SER was measured with respect to the recording power, and a lower value and a higher value of the recording power that exceeded $4 \times 10^{-3}$ were respectively represented by Pwl and Pwh. Then, the power margin PM was calculated with respect to the SER by substituting the measured recording powers Pwl and Pwh and the measured optimum recording power Pwo into the following formula.

$$PM[\%] = ((Pwh - Pwl)/Pwo) \times 100$$

Then, the L1 layer of the optical recording medium of each of the examples 4, 12 to 14, and 21 to 34 was evaluated based on the following criteria by using the calculated power margin PM.
Excellent: PM is greater than or equal to 28%
Good: PM is greater than or equal to 20% and less than 28%
Poor: PM is less than 20%

(Sensitivity)

First, a recording power (optimum recording power) PwoA of the L1 layer was measured before an acceleration test was performed. Then, the acceleration test was performed on the optical recording medium under the following conditions.
Temperature: 80° C.
Relative humidity (RH): 85%
Acceleration time: 200 hours Next, a recording power (optimum recording power) PwoB of the L1 layer was measured after the acceleration test was performed. Then, an amount of sensitivity deterioration was calculated by the following formula.

$$\text{Sensitivity deterioration}[\%] = [((PwoA) - (PwoB))/(PwoA)] \times 100$$

Then, the L1 layer of the optical recording medium of each of the examples 4, 12 to 14, and 21 to 34 was evaluated based on the following criteria by using the calculated sensitivity deterioration.
Excellent: The amount of the sensitivity deterioration is not more than 10%.
Good: The amount of the sensitivity deterioration is greater than 10% and not more than 20%.
Poor: The amount of the sensitivity deterioration is greater than 20%.

Table 6 shows the composition of the recording layer included in the L1 layer of the optical recording medium of each of the examples 4, 12, and 21 to 27.

TABLE 6

| | Metal $M_A$ | | Metal $M_B$ | | Metal $M_C$ | | $(a1 + a2)/(b1 + b2)$ | $a1/a2$ | $b1/b2$ |
|---|---|---|---|---|---|---|---|---|---|
| | Material $M_{A1}$ | Material $M_{A2}$ | Material $M_{B1}$ | Material $M_{B2}$ | Material | Atomic ratio c [atomic %] | $[(M_{A1} + M_{A2})/(M_{B1} + M_{B2})]$ [—] | $(M_{A1}/M_{A2})$ [—] | $(M_{B1}/M_{B2})$ [—] |
| Example 21 | Mn | — | W | — | Zr | 5.0 | 1.00 | — | — |
| Example 22 | Mn | Ni | W | — | Zr | 5.0 | 1.00 | 2.6 | — |
| Example 23 | Mn | Ni | W | — | Zr | 5.0 | 1.00 | 1.0 | — |
| Example 24 | Mn | Ni | W | — | Zr | 5.0 | 1.00 | 0.4 | — |
| Example 25 | — | Ni | W | — | Zr | 5.0 | 1.00 | 0 | — |
| Example 4 | Mn | — | W | — | Zr | 5.0 | 0.72 | — | — |
| Example 26 | Mn | Ni | W | — | Zr | 5.0 | 0.72 | 1.6 | — |
| Example 27 | Mn | Ni | W | — | Zr | 5.0 | 0.72 | 0.6 | — |
| Example 12 | — | Ni | W | — | Zr | 5.0 | 0.72 | 0 | — |

Table 7 shows the results of evaluating the L1 layer of the optical recording medium of each of the examples 4, 12, and 21 to 27.

TABLE 7

| | Transmittance [%] | Evaluation of transmittance | Pwo [mW] | Evaluation of Pwo | Modulation degree | Evaluation of modulation degree | Evaluation of power margin | Evaluation of sensitivity deterioration |
|---|---|---|---|---|---|---|---|---|
| Example 21 | 66.7 | Good | 13.74 | Excellent | 57.0 | Excellent | Good | Good |
| Example 22 | 67.8 | Good | 15.47 | Excellent | 53.6 | Excellent | Excellent | Good |
| Example 23 | 68.4 | Good | 15.96 | Excellent | 52.4 | Excellent | Excellent | Good |
| Example 24 | 69.1 | Good | 16.45 | Excellent | 51.2 | Excellent | Excellent | Good |
| Example 25 | 69.8 | Good | 11.51 | Excellent | 57.1 | Excellent | Good | Excellent |
| Example 4 | 70.4 | Excellent | 15.73 | Excellent | 50.5 | Excellent | Good | Good |
| Example 26 | 70.1 | Excellent | 15.73 | Excellent | 50.5 | Excellent | Excellent | Good |
| Example 27 | 70.6 | Excellent | 16.10 | Excellent | 49.6 | Excellent | Excellent | Good |
| Example 12 | 79.8 | Excellent | 16.74 | Excellent | 51.0 | Excellent | Good | Excellent |

Table 8 shows the composition of the recording layer included in the L1 layer of the optical recording medium of each of the examples 4, 13, 14, and 28 to 32.

TABLE 8

| | Metal $M_A$ | | Metal $M_B$ | | Metal $M_C$ | | (a1 + a2)/(b1 + b2) | a1/a2 | b1/b2 |
|---|---|---|---|---|---|---|---|---|---|
| | Material $M_{A1}$ | Material $M_{A2}$ | Material $M_{B1}$ | Material $M_{B2}$ | Material | Atomic ratio c [atomic %] | $[(M_{A1} + M_{A2})/(M_{B1} + M_{B2})]$ [—] | $(M_{A1}/M_{A2})$ [—] | $(M_{B1}/M_{B2})$ [—] |
| Example 28 | Mn | — | W | — | Zr | 5.0 | 0.94 | — | — |
| Example 29 | Mn | — | W | Mo | Zr | 5.0 | 0.94 | — | 2.0 |
| Example 30 | Mn | — | W | Mo | Zr | 5.0 | 0.94 | — | 0.5 |
| Example 13 | Mn | — | — | Mo | Zr | 5.0 | 0.94 | — | 0 |
| Example 4 | Mn | — | W | — | Zr | 5.0 | 0.72 | — | — |
| Example 31 | Mn | — | W | Mo | Zr | 5.0 | 0.72 | — | 2.0 |
| Example 32 | Mn | — | W | Mo | Zr | 5.0 | 0.72 | — | 0.5 |
| Example 14 | Mn | — | — | Mo | Zr | 5.0 | 0.72 | — | 0 |

Table 9 shows the results of evaluating the L1 layer of the optical recording medium of each of the examples 4, 13, 14, and 28 to 32.

TABLE 9

| | Transmittance [%] | Evaluation of transmittance | Pwo [mW] | Evaluation of Pwo | Modulation degree | Evaluation of modulation degree | Evaluation of power margin | Evaluation of sensitivity deterioration |
|---|---|---|---|---|---|---|---|---|
| Example 28 | 67.4 | Good | 14.16 | Excellent | 55.8 | Excellent | Good | Good |
| Example 29 | 66.7 | Good | 13.66 | Excellent | 54.6 | Excellent | Excellent | Good |
| Example 30 | 66.0 | Good | 13.17 | Excellent | 53.4 | Excellent | Excellent | Good |
| Example 13 | 69.5 | Good | 15.24 | Excellent | 54.7 | Excellent | Excellent | Good |
| Example 4 | 70.4 | Excellent | 15.73 | Excellent | 50.5 | Excellent | Good | Good |
| Example 31 | 70.0 | Excellent | 15.18 | Excellent | 49.4 | Excellent | Excellent | Good |
| Example 32 | 70.2 | Excellent | 14.63 | Excellent | 48.4 | Excellent | Excellent | Good |
| Example 14 | 72.6 | Excellent | 16.91 | Excellent | 49.9 | Excellent | Excellent | Good |

Table 10 shows the composition of the recording layer included in the L1 layer of the optical recording medium of each of the examples 33 and 34.

TABLE 10

| | Metal $M_A$ | | Metal $M_B$ | | Metal $M_C$ | | (a1 + a2)/(b1 + b2) | a1/a2 | b1/b2 |
|---|---|---|---|---|---|---|---|---|---|
| | Material $M_{A1}$ | Material $M_{A2}$ | Material $M_{B1}$ | Material $M_{B2}$ | Material | Atomic ratio c [atomic %] | $[(M_{A1} + M_{A2})/(M_{B1} + M_{B2})]$ [—] | $(M_{A1}/M_{A2})$ [—] | $(M_{B1}/M_{B2})$ [—] |
| Example 33 | Mn | Ni | W | Mo | Zr | 5.0 | 1.00 | 1.6 | 0.5 |
| Example 34 | Mn | Ni | W | Mo | Zr | 5.0 | 0.72 | 1.6 | 0.5 |

Table 11 shows the results of evaluating the L1 layer of the optical recording medium of each of the examples 33 and 34.

TABLE 11

| | Transmittance [%] | Evaluation of transmittance | Pwo [mW] | Evaluation of Pwo | Modulation degree | Evaluation of modulation degree | Evaluation of power margin | Evaluation of sensitivity deterioration |
|---|---|---|---|---|---|---|---|---|
| Example 33 | 66.6 | Good | 14.61 | Excellent | 50.8 | Excellent | Excellent | Excellent |
| Example 34 | 70.0 | Excellent | 14.63 | Excellent | 48.4 | Excellent | Excellent | Excellent |

Here, the symbols "a1", "a2", "b1", "b2", and "c" in Tables 6, 8, and 10 represent the contents as follows.
a1: an amount of Mn (metal $M_{A1}$) in the recording layer
a2: an amount of Ni (metal $M_{A2}$) in the recording layer
b1: an amount of W (metal $M_{B1}$) in the recording layer
b2: an amount of Mo (metal $M_{B2}$) in the recording layer
c: an amount (atomic %) of Mc in the recording layer The following tendencies can be known from Tables 6 and 7. That is, by using both Mn and Ni as the metal $M_A$, the power margin is greatly improved. When the atomic ratio (Mn/Ni) of Mn to Ni is not less than 0.4 and not more than 2.6, the power margin is greatly improved. By using Ni as the metal $M_A$, the sensitivity deterioration is decreased before and after the acceleration test, compared with the case of using both Mn and Ni or using Mn as the metal $M_A$.

The following tendencies can be known from Tables 8 and 9. That is, by using both W and Mo as the metal $M_B$, the power margin is greatly improved. When the atomic ratio (W/Mo) of W to Mo is not more than 2.0, the power margin is greatly improved. By using Mo as the metal $M_B$, the power margin is improved compared with the case of using W as the metal $M_B$.

The following tendencies can be known from Tables 9 and 10. That is, by using both Mn and Ni as the metal $M_A$ and also using both W and Mo as the metal $M_B$, the power margin is improved, and the sensitivity deterioration is decreased before and after the acceleration test.

Although an embodiment and examples of the present technique are specifically described above, the present technique is not limited to the embodiment and the examples described above, and various kinds of modifications can be performed based on the concept of the present technique.

For example, the structures, the methods, the steps, the shapes, the materials, the values, etc. described in the embodiment and the examples are merely examples and may be changed as necessary.

In addition, the structures, the methods, the steps, the shapes, the materials, the values, etc. described in the embodiment and the examples can be used by changing their combinations as long as the concept of the present technique is not exceeded.

Additionally, the present technology may also be configured as below.

(1)
An optical recording medium including a transmissive recording layer containing an oxide of a metal $M_A$, an oxide of a metal $M_B$, and an oxide of a metal $M_C$,
wherein the metal $M_A$ is at least one kind selected from the group consisting of Mn and Ni,
wherein the metal $M_B$ is at least one kind selected from the group consisting of W and Mo,
wherein the metal Mc is Zr,
wherein an atomic ratio ($M_A/M_B$) of the metal $M_A$ to metal $M_B$ is not less than 0.37 and not more than 1.31, and
wherein the metal $M_C$ is contained in the transmissive recording layer at not less than 0.9 atomic % and not more than 27.5 atomic %.

(2)
The optical recording medium according to (1),
wherein the transmissive recording layer further contains an oxide of a metal $M_E$, and
wherein the metal $M_E$ is Mg.

(3)
The optical recording medium according to (2),
wherein the metal $M_E$ is contained in the transmissive recording layer at not less than 6.6 atomic % and not more than 43.0 atomic %.

(4)
The optical recording medium according to any of (1) to (3),
wherein the number of the transmissive recording layers is two.

(5)
The optical recording medium according to any of (1) to (3),
wherein the metal $M_C$ is contained in the transmissive recording layer at not less than 0.9 atomic % and not more than 8.5 atomic %.

(6)
The optical recording medium according to (5),
wherein the number of the transmissive recording layers is three.

(7)
The optical recording medium according to any of (1) to (6),
wherein an atomic ratio ($M_A/M_B$) of the metal $M_A$ to the metal $M_B$ is not less than 0.54 and not more than 0.78.

(8)
The optical recording medium according to any of (1) to (7),
wherein the transmissive recording layer further contains an oxide of a metal $M_D$, and
wherein the metal $M_D$ is at least one kind selected from the group consisting of Cu and Zn.

(9)
The optical recording medium according to any of (1) to (8),
wherein the metal $M_A$ is both Mn and Ni.

(10)
The optical recording medium according to any of (1) to (8),
wherein the metal $M_B$ is both W and Mo.

(11)
The optical recording medium according to any of (1) to (8),
wherein the metal $M_A$ is both Mn and Ni, and
wherein the metal $M_B$ is both W and Mo.

(12)
The optical recording medium according to any of (1) to (11), further including a dielectric layer provided on at least one of surfaces of the transmissive recording layer.

(13)

The optical recording medium according to any of (1) to (11), further including a dielectric layer provided on each of both surfaces of the transmissive recording layer.

(14)

A recording layer for an optical recording medium, including:
- an oxide of a metal $M_A$;
- an oxide of a metal $M_B$; and
- an oxide of a metal $M_C$,
- wherein the metal $M_A$ is at least one kind selected from the group consisting of Mn and Ni,
- wherein the metal $M_B$ is at least one kind selected from the group consisting of W and Mo,
- wherein the metal Mc is Zr,
- wherein an atomic ratio ($M_A/M_B$) of the metal $M_A$ to the metal $M_B$ is not less than 0.37 and not more than 1.31, and
- wherein the metal $M_C$ is contained in the transmissive recording layer at not less than 0.9 atomic % and not more than 27.5 atomic %.

REFERENCE SIGNS LIST 11 substrate
12 light transmissive layer
10 optical recording medium
21 recording layer
22, 23 dielectric layer
L0 to Ln information signal layer
S1 to Sn middle layer
Gin in-groove
Gon on-groove
C light irradiation surface

The invention claimed is:

1. An optical recording medium comprising at least one transmissive recording layer containing an oxide of a metal $M_A$, an oxide of a metal $M_B$, an oxide of a metal $M_C$, and an oxide of a metal $M_E$,
- wherein the metal $M_A$ comprises at least one kind selected from a group consisting of Mn and Ni,
- wherein the metal $M_B$ comprises at least one kind selected from a group consisting of W and Mo,
- wherein the metal $M_C$ comprises Zr,
- wherein the metal $M_E$ comprises Mg,
- wherein an atomic ratio ($M_A/M_B$) of the metal $M_A$ to the metal $M_B$ is not less than 0.37 and not more than 1.31, and
- wherein the metal $M_C$ is contained in the at least one transmissive recording layer at not less than 0.9 atomic % and not more than 27.5 atomic %.

2. The optical recording medium according to claim 1, wherein the metal $M_E$ is contained in the at least one transmissive recording layer at not less than 6.6 atomic % and not more than 43.0 atomic %.

3. The optical recording medium according to claim 1, wherein the at least one transmissive recording layer comprises two transmissive recording layers.

4. The optical recording medium according to claim 1, wherein the metal $M_C$ is contained in the at least one transmissive recording layer at not less than 0.9 atomic % and not more than 8.5 atomic %.

5. The optical recording medium according to claim 4, wherein the at least one transmissive recording layer comprises three transmissive recording layers.

6. The optical recording medium according to claim 1, wherein an atomic ratio ($M_A/M_B$) of the metal $M_A$ to the metal $M_B$ is not less than 0.54 and not more than 0.78.

7. The optical recording medium according to claim 1, wherein the at least one transmissive recording layer further contains an oxide of a metal $M_D$, and wherein the metal $M_D$ comprises at least one kind selected from a group consisting of Cu and Zn.

8. An optical recording medium comprising at least one transmissive recording layer containing an oxide of a metal $M_A$, an oxide of a metal $M_B$, and an oxide of a metal $M_C$,
- wherein the metal $M_A$ comprises both Mn and Ni,
- wherein the metal $M_B$ comprises at least one kind selected from a group consisting of W and Mo,
- wherein the metal $M_C$ comprises Zr,
- wherein an atomic ratio ($M_A/M_B$) of the metal $M_A$ to the metal $M_B$ is not less than 0.37 and not more than 1.31, and
- wherein the metal $M_C$ is contained in the at least one transmissive recording layer at not less than 0.9 atomic % and not more than 27.5 atomic %.

9. An optical recording medium comprising at least one transmissive recording layer containing an oxide of a metal $M_A$, an oxide of a metal $M_B$, and an oxide of a metal $M_C$,
- wherein the metal $M_A$ comprises at least one kind selected from a group consisting of Mn and Ni,
- wherein the metal $M_B$ comprises both W and Mo,
- wherein the metal $M_C$ comprises Zr,
- wherein an atomic ratio ($M_A/M_B$) of the metal $M_A$ to the metal $M_B$ is not less than 0.37 and not more than 1.31, and
- wherein the metal $M_C$ is contained in the at least one transmissive recording layer at not less than 0.9 atomic % and not more than 27.5 atomic %.

10. The optical recording medium according to claim 8, wherein the metal $M_B$ comprises both W and Mo.

11. The optical recording medium according to claim 1, further comprising a dielectric layer provided on at least one of surfaces of the at least one transmissive recording layer.

12. The optical recording medium according to claim 1, further comprising a dielectric layer provided on each of both surfaces of the at least one transmissive recording layer.

13. A transmissive recording layer for an optical recording medium, comprising:
- an oxide of a metal $M_A$;
- an oxide of a metal $M_B$;
- an oxide of a metal $M_C$; and
- an oxide of a metal $M_E$,
- wherein the metal $M_A$ comprises at least one kind selected from a group consisting of Mn and Ni,
- wherein the metal $M_B$ comprises at least one kind selected from a group consisting of W and Mo,
- wherein the metal $M_C$ comprises Zr,
- wherein the metal $M_E$ comprises Mg,
- wherein an atomic ratio ($M_A/M_B$) of the metal $M_A$ to the metal $M_B$ is not less than 0.37 and not more than 1.31, and
- wherein the metal $M_C$ is contained in the transmissive recording layer at not less than 0.9 atomic % and not more than 27.5 atomic %.

* * * * *